US006034714A

United States Patent [19]

Ghosh et al.

[11] Patent Number: 6,034,714

[45] Date of Patent: Mar. 7, 2000

[54] METHOD AND APPARATUS FOR PREVENTING TRANSIENT OSCILLATIONS IN A FOCUSING BEAM OF SCANNERS

[75] Inventors: Syamal K. Ghosh, Rochester; Roger S. Kerr, Brockport; Edward P. Furlani, Lancaster, all of N.Y.

[73] Assignee: Eastman Kodak Company, Rochester, N.Y.

[21] Appl. No.: 08/837,065

[22] Filed: Apr. 11, 1997

[51] Int. Cl.[7] .......... G01D 15/14

[52] U.S. Cl. .......... 347/262; 347/264; 347/241; 346/138

[58] Field of Search .......... 347/241, 262, 347/264; 101/415.1, 454; 346/138; 359/35

[56] References Cited

U.S. PATENT DOCUMENTS

| | | | |
|---|---|---|---|
| 4,946,258 | 8/1990 | Fisher et al. | 359/35 |
| 5,196,866 | 3/1993 | Ferschl et al. | 347/241 |
| 5,339,737 | 8/1994 | Lewis et al. | 101/454 |
| 5,413,043 | 5/1995 | Fuhrmann et al. | 101/415.1 |

FOREIGN PATENT DOCUMENTS

| | | |
|---|---|---|
| 57-165845 | 10/1982 | Japan . |
| 6-072030 | 3/1994 | Japan . |
| 9216374 | 1/1992 | WIPO . |

*Primary Examiner*—N. Le
*Assistant Examiner*—Hai C. Pham
*Attorney, Agent, or Firm*—Peyton C. Watkins

[57] ABSTRACT

An imaging processor for receiving a medium for processing, the processor comprises a print head for providing and for directing a writing laser beam. A laser source also disposed in the image processor for creating a focusing laser beam for ultimately permitting adjustment of the writing laser beam. An imaging receptacle receives the medium and is exposed to both the writing and focusing laser beams, and the writing laser beam is periodically directed from the medium, to the imaging receptacle and back to the medium. A laser-absorbent coating is coated onto the imaging drum for absorbing the focusing laser beam that is received by the imaging receptacle for substantially eliminating transient oscillations in the writing laser beam.

8 Claims, 3 Drawing Sheets

METHOD AND APPARATUS FOR PREVENTING TRANSIENT OSCILLATIONS IN A FOCUSING BEAM OF SCANNERS

FIELD OF THE INVENTION

The invention relates generally to the field of lathe bed scanners having a rotating imaging drum for maintaining the positional relationship of donor elements and writing elements during the writing process, and having a focusing beam directed onto the writing element for permitting calibration of the writing laser beam. More particularly, the invention relates to such imaging drums having a laser-absorbent coating for substantially eliminating an undesirable, reflected laser beam originating from the focusing beam and reflected from the imaging drum which reflected beam causes the writing laser beam to produce artifacts on the writing element during writing.

BACKGROUND OF THE INVENTION

Color-proofing is the procedure used by the printing industry for creating representative images that replicate the appearance of printed images without the cost and time required to actually set up a high-speed, high-volume printing press to print an example of the images intended. One such color proofer is a lathe bed scanner which utilizes a thermal printer having half-tone capabilities. This printer is arranged to form an image on a thermal print medium, or writing element, in which a donor transfers a dye to the writing element upon a sufficient amount of thermal energy. This printer includes a plurality of writing diode lasers which can be individually modulated to supply energy to selected areas of the medium in accordance with an information signal for writing onto the writing element. A focusing laser beam is focused at the preceding position to which the writing laser beam is to write next (i.e., next printing location) for permitting adjustment of the focal point of the writing laser beam prior to its writing at the next printing location.

The writing element is supported on a rotatable imaging drum, and rests concentrically around the imaging drum with the ends of writing element positioned in a spaced apart relationship so that a portion of the imaging drum is not covered by the writing element, hereinafter referred to as the exposed portion of the imaging drum. A print-head includes one end of a fiber optic array having a plurality of optical fibers that are coupled to the writing diode lasers for transmitting the signals from the laser to the print head. The print-head with the fiber optic array is movable relative to the longitudinal axis of the drum. The dye is transferred to the writing element as the radiation, transferred from the diode lasers to the donor element by the optical fibers, is converted to thermal energy in the donor element.

The cylindrical-shaped imaging drum includes a hollowed-out interior portion and further includes a plurality of holes extending through its housing for permitting a vacuum to be applied from the interior of the drum to the receiver and writing elements for maintaining their position as the drum is rotated.

During the writing process, the print head emits the laser beam as it moves along the drum. The beam then passes through the donor element for causing the dye to transfer to the writing element.

Although the presently known and utilized scanner is satisfactory, it is not without drawbacks. The focusing laser beam is sometimes directed from the writing element, to the imaging drum and back to the writing element due to the fact that writing element does not cover the exposed portion of the imaging drum. This reflected beam causes the focusing of the writing laser beam to have transient oscillations which can create undesirable artifacts in the writing element.

Consequently, a need exists for improvements in the construction of the lathe bed scanner so as to overcome the above-described shortcomings.

SUMMARY OF THE INVENTION

The present invention is directed to overcoming one or more of the problems set forth above. Briefly summarized, according to one aspect of the present invention, the invention resides in an imaging processor for receiving a medium for processing. The processor comprises a print head for providing and for directing a writing laser beam. A laser source also disposed in the image processor for creating a focusing laser beam for ultimately permitting adjustment of the writing laser beam. An imaging receptacle receives the medium and is exposed to both the writing and focusing laser beams, and the focusing laser beam is periodically directed from the medium, to the imaging receptacle and back to the medium. A laser-absorbent coating is coated onto the imaging drum for absorbing the focusing laser beam that is received by the imaging receptacle for substantially eliminating transient oscillations in the writing laser beam.

It is an object of the present invention to coat the drum with a laser-absorbent coating so as to overcome the above-described drawbacks.

It is an advantage of the present invention to provide cost-efficient means for implementing the present invention.

It is a feature of the present invention to provide a laser-absorbent coating coated onto the imaging drum for absorbing the focusing laser beam that is received by the imaging drum for substantially eliminating transient oscillations in the writing laser beam.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
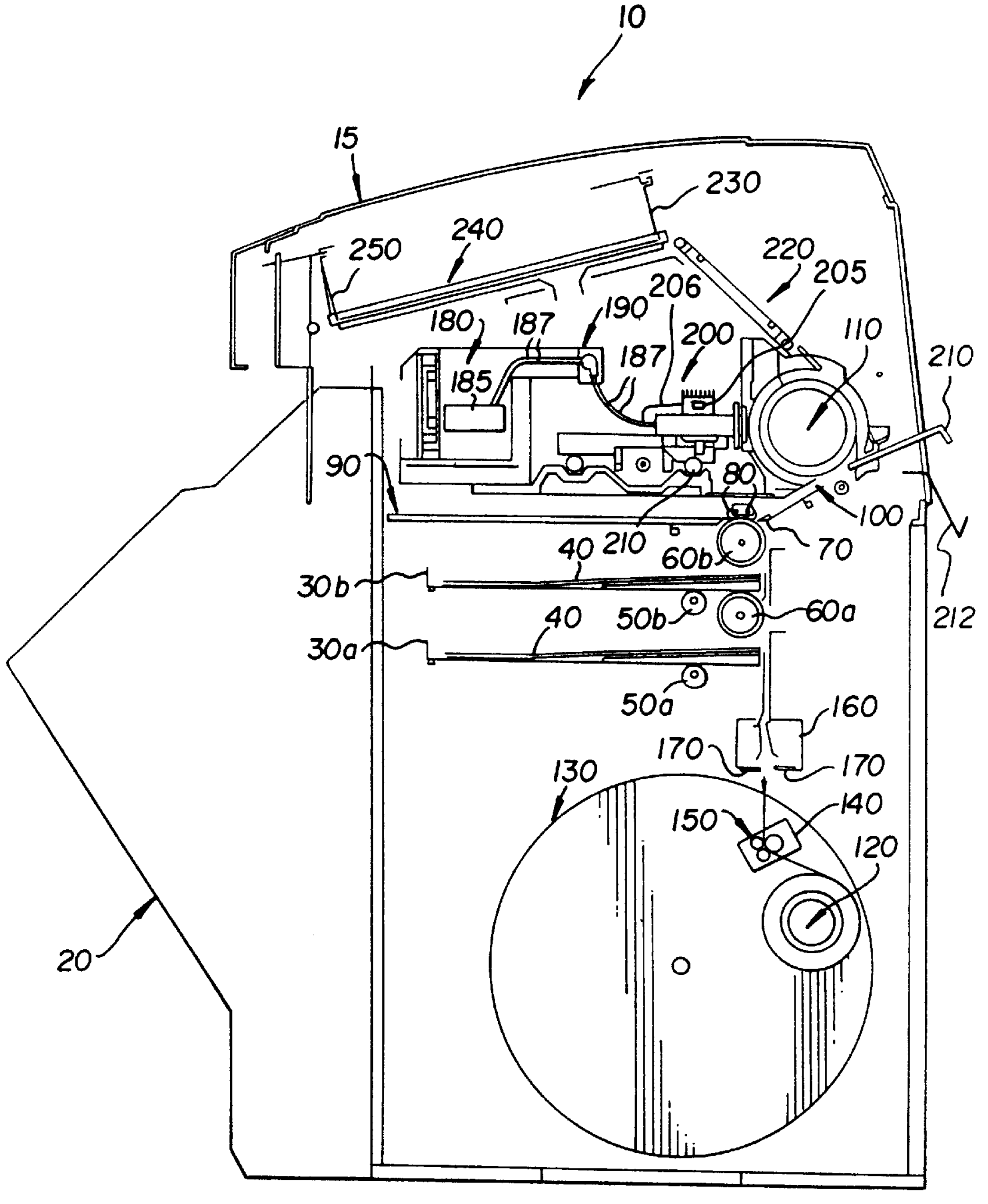
FIG. 1 is a side view in vertical cross section of a lathe bed scanner of the present invention.

Referring to FIG. 1, there is illustrated a lathe bed scanner 10 of the present invention having a housing 15 for forming a protective cover. A movable, hinged door 20 is attached to a front portion of the housing 15 for permitting access to two media trays, a lower tray 30*a* and upper tray 30*b*, that are positioned in an interior portion of the housing 15 for supporting receiver material 40, typically paper, thereon. It is obvious to those skilled in the art that only one media tray 30 will dispense receiver material 40 out of its paper tray 30 for creating an image thereon; the alternate media tray 30 either holds an alternative type of paper or functions as backup. In this regard, the lower media tray 30*a* includes a cam 50*a* for lifting the paper 40 upwardly toward a rotatable, lower media roller 60*a* and, ultimately, toward a second rotatable, upper media roller **60*b* which, when both are rotated, permits the receiver material 40 to be pulled upwardly towards a media guide 70. The upper media tray 30*b* also includes a cam 50*b* for lifting the receiver material 40 toward the upper media roller 60*b* which directs it towards the media guide 70**.

As illustrated by the phantom position, the movable media guide 70 directs the receiver material 40 under a pair of rollers 80 which engages the receiver material 40 for assisting the upper media roller **60*b* in directing it onto a staging tray 90. The media guide 70 is attached and hinged to the interior of the housing 15 at one end, and is uninhibited at its other end for permitting multiple positioning of the media guide 70. The media guide 70 then rotates its uninhibited end downwardly, as illustrated by the solid line, and the direction of rotation of the upper media roller 60*b* is reversed for forcing the receiver material 40 resting on the staging tray 90 back under the rollers 80, upwardly through an entrance passageway 100 and around a rotatable imaging drum 110**.

Four rolls of donor material 120 (only one is shown) are connected to a carousel 130 in a lower portion of the housing 15, and each roll includes a donor material 120 of a different color, typically black, yellow, magenta and cyan. These donor materials are ultimately cut into sheets and passed to the imaging drum for forming a medium from which dyes imbedded therein are passed to the receiver material resting thereon, which process is described in detail herein below. In this regard, a drive mechanism 140 is attached to each roll 120, and includes three rollers 150 through which the donor material 120 of interest is rolled upwardly into a knife assembly 160. After the donor material 120 reaches a predetermined position, the rollers 150 cease driving the donor material 120 and two blades 170 positioned at the bottom portion of the knife assemble cut the donor material 120 into a sheet. The media rollers **60*a* and 60*b* and media guide 70 then pass the donor material 120 onto the drum 10 and in registration with the receiver material 40 using the same process as described above for passing the receiver material 40 onto the drum 110. The donor material 120 rests atop the receiver material 40 with a narrow gap between the two created by microbeads imbedded into the receiver material 40**.

A laser assembly 180 includes twenty writing lasers 185 in its interior, and these lasers are connected via fiber optic cables 187 to a coupling head 190 and ultimately to a write head 200. The write head 200 creates thermal energy from the signal received from the lasers 185 causing the donor material 120 to pass its dye across the gap to the receiver material 40. The writing lasers 185 preferably emit a wavelength between 800 and 880 nm. The write head 200 is attached to a lead screw 210 via a nut (not shown in FIG. 1) for permitting it to move axially along the longitudinal axis of the drum 110 for writing data onto the receiver material 40.

A focusing laser assembly 205 is mounted to the print head 200 and includes a laser in its interior for providing a laser beam which will be used for assisting in focusing the writing lasers 185. A fiber optic cable 206 connects the focusing laser assembly 205 to the print head 200 out of which the beam is emitted. The focusing laser assembly 205 is selected to produce a second beam of light having a wavelength different from the wavelength of the writing beam and preferably outside the range of 800 nm–880 nm. Preferably, the focusing light source produces a beam of light having a predominant wavelength of 960 nm. It has been found that a focusing beam having a wavelength of 960 nm is substantially unabsorbed by all of the various donor dye materials 120. As a result, substantially all of the focusing beam of this wavelength will penetrate the donor material 120, regardless of the color dye employed, to be reflected from the reflective surface which is part of the receiver element 40. Inasmuch as this surface has been found to be much closer to the dye layer, where it is desirable to focus the writing beam, rather than the top surface of the donor layer 120, it is possible for both the writing beam and the focusing beam to be aimed at more nearly the same surface than is possible if the focusing beam is reflected from some other surface of the receiver element 40. As a result, the writing beam may have less depth of focus and consequently may have a greater numerical aperture which permits the transmission of greater writing power to the receiver element 40 than would be the case were the focusing beam and the writing beam to be focused at more widely separated surfaces.

For writing, the drum 110 rotates at a constant velocity, and the write head 200 begins at one end of the receiver material 40 and traverses the entire length of the receiver material 40 for completing the transfer process for the particular donor material resting on the receiver material 40. To maintain focus of the writing beam the focus laser assembly 205 emits beam of light which is reflected off from the reflective layer in the receiver element 40 back to the print head 200 and is monitored therein by the focus control circuit (not shown) to detect any change in the energy level of the focus beam. A change in energy level indicates a change in position of the reflective layer in the receiver material 40 which indicates a corresponding change in the position of the dye layer on the donor material 120. When a change is detected the focus control circuitry sends a signal to the focusing lens assembly (not shown) which adjusts the position of the focusing lens (not shown) thus maintaining focus of the writing beam. After the donor material 120 has completed its dye transfer, the donor material 120 is then transferred from the drum 110 and out of the housing 15 via a skive or ejection chute 210. The donor material eventually comes to rest on a donor material tray 212 for permitting removal by a user. The above-described process is then repeated for the other three rolls of donor material.

After all four sheets of donor material have transferred their dyes, the receiver material 40 is transported via a transport mechanism 220 through an entrance door 230 and into a dye binding assembly 240 where it rests against an exit door 250. The entrance door 230 is opened for permitting the receiver material 40 to enter into the dye binding assembly 240, and shuts once it comes to rest in the dye binding assembly 240. The dye binding assembly 240 heats the receiver material 40 for further binding the transferred dye on the receiver material 40 and for sealing the microbeads thereon. After heating, the exit door 250 is opened and the receiver material 40 with the image thereon passes out of the housing 15 and comes to rest against a stop 260.

Figure 2:
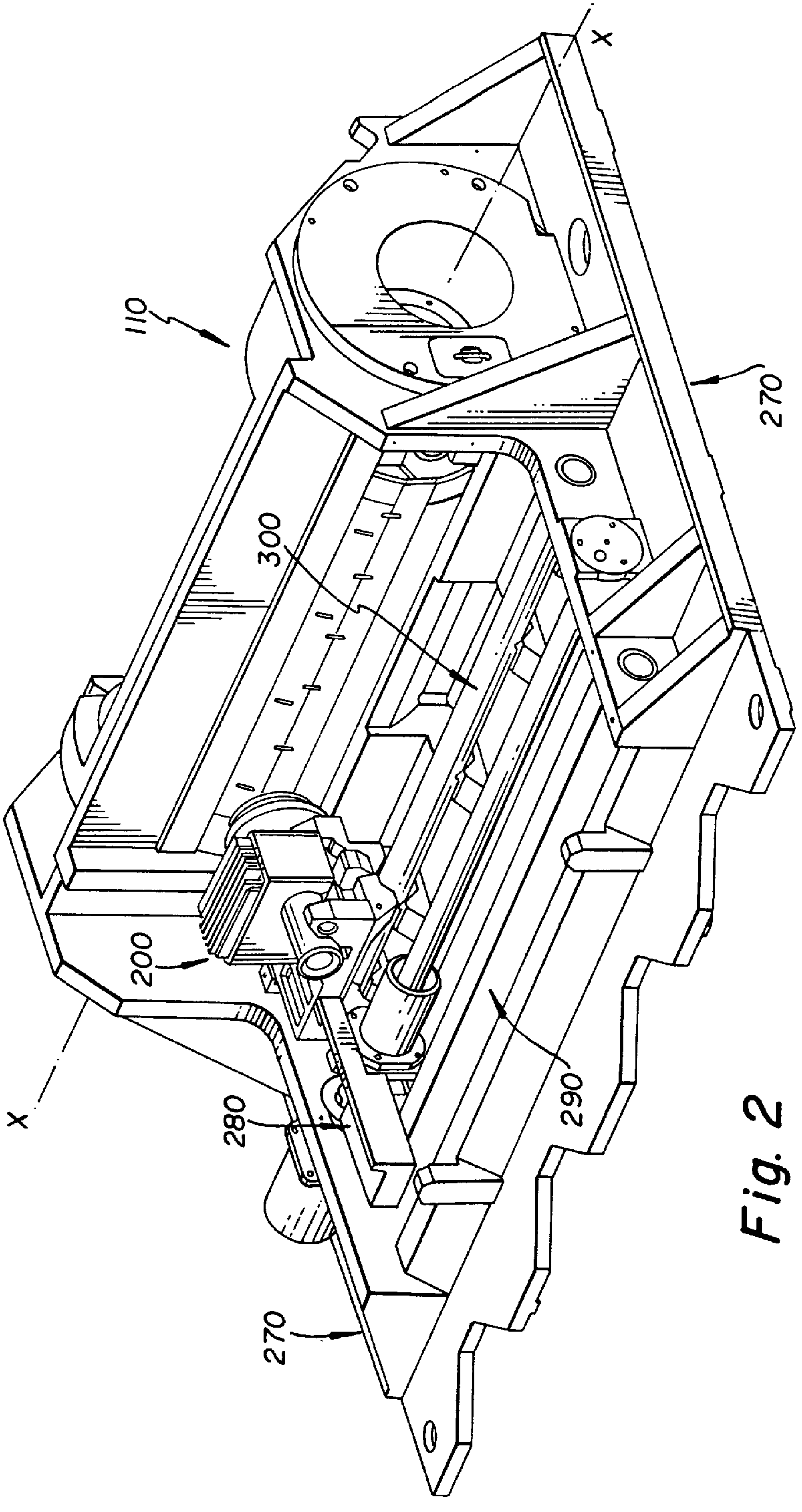
FIG. 2 is a perspective view of an imaging drum, laser writer and lead screw of the present invention.

Referring to FIG. 2, there is illustrated a perspective view of the imaging drum 110 and write head 200 of the lathe bed scanner 10. The imaging drum 110 is mounted for rotation about an axis (x) in a frame support 270. The write head 200 is movable with respect to the imaging drum 110, and is arranged to direct a beam of actinic light to the donor material 120 (shown in FIG. 1). The write head 200 contains therein a plurality of writing elements (not shown) which can be individually modulated by electronic signals from the laser diodes 185, which signals are representative of the shape and color of the original image, so that each dye is heated to cause volatilization only in those areas in which its presence is required on the receiver material 40 to reconstruct the color of the original object.

The write head 200 is mounted on a movable translator member 280 which, in turn, is supported for low friction slidable movement on bars 290 and 300. The bars 290 and 300 are sufficiently rigid so that they do not sag or distort between the mounting points at their ends and are arranged as parallel as possible with the axis (x) of the imaging drum 110. The upper bar 300 is arranged to locate the axis of the writing head 200 precisely on the axis (x) of the drum 110 with the axis of the writing head perpendicular to the drum axis (x). The upper bar 300 locates the translator member 280 in the vertical and the horizontal directions with respect to the axis of the drum 110. The lower bar 290 locates the translator member 280 only with respect to rotation of the translator about the bar 290 so that there is no over-constraint of the translator member 280 which might cause it to bind, chatter, or otherwise impart undesirable vibration to the writing head 200 during the generation of an image.

Figure 3:
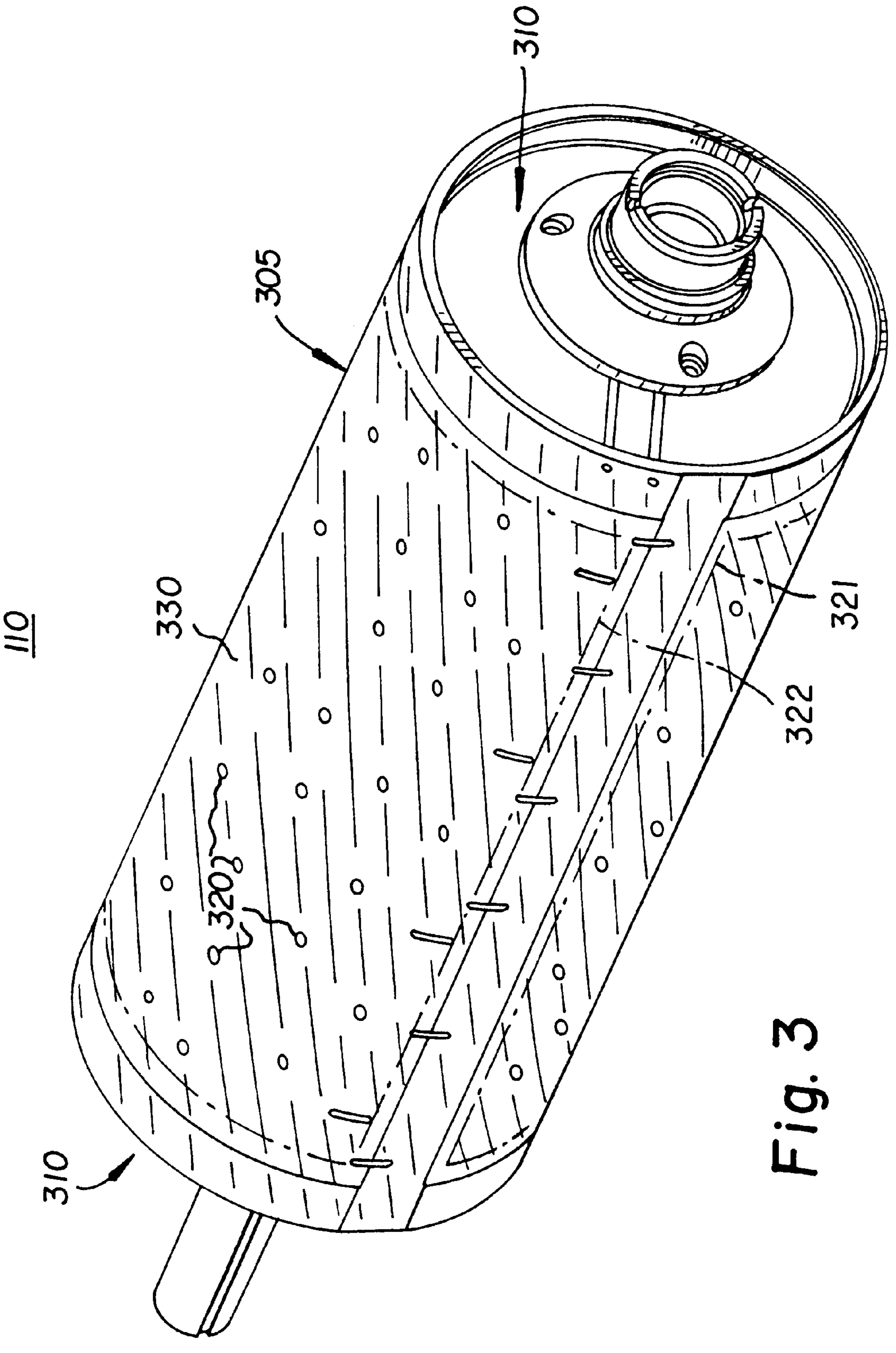
FIG. 3 is perspective view of the imaging drum of the present invention.

Referring to FIGS. 3, there is illustrated the imaging drum 110 having a cylindrical-shaped housing 305 partially and respectively enclosed on both ends by two plates 310. The housing 305 further includes a hollowed-out interior (annular shaped in vertical cross section) for permitting a vacuum to be applied from its interior portion. A plurality of holes 320 extend entirely through the housing 305 for permitting the vacuum to maintain the donor 120 and writing elements 40 thereon during rotation of the drum 110.

It is constructive to note that the receiver element 40 does not cover all of the vacuum imaging drum 110 so that a gap is formed between the lead edge 322 and trail edge 321 of the receiver element 40.

A black chrome coating 330 is applied on the housing 305 by using well known techniques such as electroplating, thermal spraying or physical vapor deposition. These black chrome coatings have a total reflectance of between 0–5% from 900 nm to 1000 nm which includes the focusing beam's wave length of 960 nm. When the focusing beam is exposed to the drum 110 due to the gap formed between the lead edge 322 and trail edge 321 of the receiver element 40, the coating 330 absorbs all or substantially all of the focusing beam that would otherwise reflect off the drum surface; if not absorbed, this reflected beam would cause the focusing of the writing laser beam to have transient oscillations which can create undesirable artifacts in the writing element.

The invention has been described with reference to a preferred embodiment. However, it will be appreciated that variations and modifications can be effected by a person of ordinary skill in the art without departing from the scope of the invention.

We claim:

1. An imaging processor for receiving a medium for processing, the processor comprising:

(a) a print head for providing and for directing a writing laser beam;

(b) means for creating a focusing laser beam for ultimately permitting adjustment of the writing laser beam;

(c) an imaging receptacle for receiving the medium which is exposed to both the writing and focusing laser beams, said medium having leading and trailing edges so arranged as to expose a portion of the receptacle to the focusing laser beam, and the focusing laser beam is periodically directed from the medium to said exposed portion of the imaging receptacle and back to the medium; and, (d) a laser-absorbent coating coated onto said imaging receptacle for absorbing the focusing laser beam that is received by said exposed portion of the imaging receptacle for substantially eliminating transient oscillations in focusing of the writing laser beam.

2. The imaging processor as in claim 1, wherein said coating absorbs electromagnetic irradiation in the range of substantially 900 to 1000 nanometers.

3. The imaging processor as in claim 2, wherein said imaging receptacle includes a substantially cylindrical shape.

4. An imaging drum for retaining a medium suitable for writing thereon, the imaging drum comprising:

(a) a substantially cylindrical-shaped body for retaining the medium which is exposed to both writing and focusing laser beams, wherein a gap region is formed on the body between the leading and trailing edges of the medium and the focusing laser beam is periodically directed from the medium to the gap region on the body and back to the medium; and, (b) black chrome coated onto said body and having substantially 95 percent absorption for absorbing the focusing laser beam that is received by said imaging drum on the gap region for substantially eliminating transient oscillation in focusing of the writing laser beam.

5. The imaging drum as in claim 4, wherein said coating absorbs electromagnetic irradiation in the range of substantially 900 to 1000 nanometers.

6. An imaging receptacle for retaining a medium suitable for writing thereon, the imaging receptacle comprising:

(a) a housing for retaining the medium on a portion thereof which is exposed to both writing and focusing laser beams, wherein the focusing laser beam is periodically directed from the medium to the housing and back to the medium; and, (b) black chrome coated onto said housing and having substantially 95 percent absorption for absorbing the focusing laser beam that is received by said imaging receptacle outside of said portion thereof for substantially eliminating transient oscillations in focusing of the writing laser beam.

7. The imaging receptacle as in claim 6, wherein said coating absorbs electromagnetic irradiation in the range of substantially 900 to 1000 nanometers.

8. The imaging receptacle as in claim 7, wherein said housing includes a plurality of perforations for permitting a vacuum to retain the medium onto said housing.

* * * * *